United States Patent
Clements et al.

(10) Patent No.: US 10,731,070 B2
(45) Date of Patent: Aug. 4, 2020

(54) POLY (VINYL CARPROLACTAM) KINETIC GAS HYDRATE INHIBITOR AND METHOD FOR PREPARING THE SAME

(71) Applicant: Indorama Ventures Oxides LLC, The Woodlands, TX (US)

(72) Inventors: John Clements, The Woodlands, TX (US); Marek K. Pakulski, The Woodlands, TX (US); Jay Riethmeyer, Spring, TX (US); David C. Lewis, Conroe, TX (US)

(73) Assignee: INDORAMA VENTURES OXIDES LLC, The Woodlands, TX (US)

( * ) Notice: Subject to any disclaimer, the term of this patent is extended or adjusted under 35 U.S.C. 154(b) by 0 days.

(21) Appl. No.: 15/559,852

(22) PCT Filed: Aug. 12, 2016

(86) PCT No.: PCT/US2016/046667
§ 371 (c)(1),
(2) Date: Sep. 20, 2017

(87) PCT Pub. No.: WO2017/048424
PCT Pub. Date: Mar. 23, 2017

(65) Prior Publication Data
US 2019/0249069 A1    Aug. 15, 2019

Related U.S. Application Data

(60) Provisional application No. 62/220,374, filed on Sep. 18, 2015.

(51) Int. Cl.
*C09K 8/52*     (2006.01)
*C10L 1/236*     (2006.01)
*C10L 10/04*     (2006.01)
*C10L 3/10*     (2006.01)
*C09K 8/035*     (2006.01)
(Continued)

(52) U.S. Cl.
CPC ............ *C09K 8/52* (2013.01); *C08F 126/06* (2013.01); *C09K 8/035* (2013.01); *C10G 75/04* (2013.01); *C10L 1/2368* (2013.01); *C10L 3/107* (2013.01); *C10L 10/04* (2013.01); *C09K 2208/22* (2013.01); *C10G 2300/80* (2013.01)

(58) Field of Classification Search
None
See application file for complete search history.

(56) References Cited

U.S. PATENT DOCUMENTS

| | | |
|---|---|---|
| 5,432,292 A | 7/1995 | Sloan, Jr. |
| 5,874,660 A | 2/1999 | Colle et al. |
| 5,880,319 A | 3/1999 | Sloan, Jr. |

(Continued)

FOREIGN PATENT DOCUMENTS

EP       1023090 B1     1/2003

*Primary Examiner* — John J Figueroa

(57) ABSTRACT

The present disclosure provides a poly(vinyl caprolactam) polymer obtained by polymerizing a vinyl lactam compound in a polymerization solvent system comprising an alkylene carbonate and/or an alkyl lactate and a polymerization initiator. The poly(vinyl caprolactam) polymer, in admixture with the polymerization solvent system, may be used as a kinetic gas hydrate inhibitor to prevent or inhibit formation of natural gas and/or liquid hydrocarbon hydrates in a system.

18 Claims, 1 Drawing Sheet

(51) Int. Cl.
*C08F 126/06* (2006.01)
*C10G 75/04* (2006.01)

(56) References Cited

U.S. PATENT DOCUMENTS

| | | | |
|---|---|---|---|
| 6,096,815 | A | 8/2000 | Cohen et al. |
| 6,180,699 | B1 | 1/2001 | Bakeev et al. |
| 6,194,622 | B1 | 2/2001 | Peiffer et al. |
| 6,242,518 | B1* | 6/2001 | Bakeev .................... C07C 7/20 |
| | | | 137/13 |
| 6,281,274 | B1 | 8/2001 | Bakeev et al. |
| 6,359,047 | B1 | 3/2002 | Thieu et al. |
| 6,451,892 | B1 | 9/2002 | Bakeev et al. |
| 6,630,168 | B1 | 10/2003 | Jones et al. |
| 6,867,262 | B1 | 3/2005 | Angel et al. |
| 2006/0009363 | A1* | 1/2006 | Crews ................... C09K 8/685 |
| | | | 507/100 |
| 2008/0196897 | A1* | 8/2008 | Nguyen ................. C09K 8/502 |
| | | | 166/295 |
| 2008/0227025 | A1 | 9/2008 | Kanda |
| 2008/0255326 | A1* | 10/2008 | Widmaier ............. C08F 283/06 |
| | | | 526/79 |
| 2009/0325823 | A1* | 12/2009 | Pakulski ................. C09K 8/52 |
| | | | 507/90 |
| 2012/0077717 | A1 | 3/2012 | Musa et al. |
| 2012/0318515 | A1* | 12/2012 | Cawiezel ............... C09K 8/035 |
| | | | 166/310 |
| 2013/0261275 | A1* | 10/2013 | Musa .................... C08F 226/06 |
| | | | 526/264 |

* cited by examiner

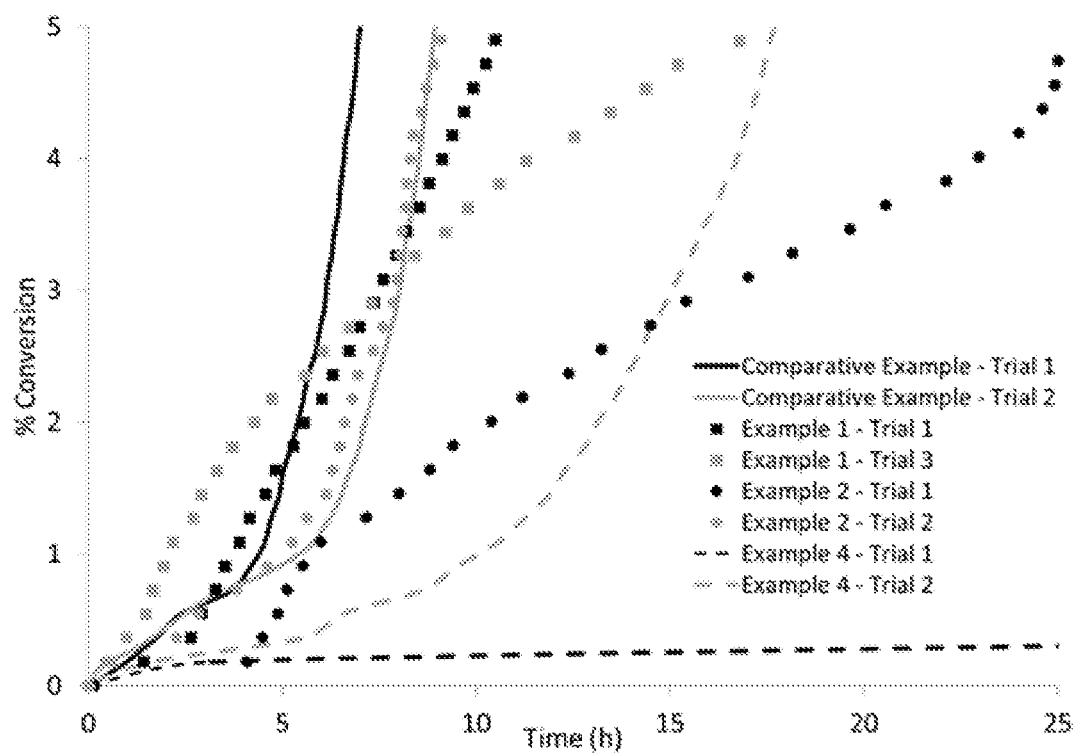

POLY (VINYL CARPROLACTAM) KINETIC GAS HYDRATE INHIBITOR AND METHOD FOR PREPARING THE SAME

CROSS-REFERENCE TO RELATED APPLICATIONS

This application is the National Phase of International Application PCT/US2016/046667 filed Aug. 12, 2016 which designated the U.S. and which claims priority to U.S. App. Ser. No. 62/220,374 filed Sep. 18, 2015. The noted applications are incorporated herein by reference.

FIELD OF INVENTION

This disclosure relates to kinetic hydrate inhibitors, in particular kinetic gas hydrate inhibitors, and methods for preparing such hydrate inhibitors. The kinetic hydrate inhibitors find application in a variety of fields including, but not limited to, gas hydrate inhibition in well drilling, completion, natural gas production, processing, transportation and storage.

BACKGROUND OF THE INVENTION

The formation of gas hydrates has long been recognized as a potential problem in the oil and gas industry. During recent years the general trend within the industry to make more efficient designs and to minimize cost wherever possible has led to considerable effort to understand hydrate formation and methods to prevent or inhibit such formation.

Gas hydrates are solids that form from a combination of water and one or more hydrocarbon or non-hydrocarbon gases. In physical appearance, gas hydrates resemble packed snow or ice. In a gas hydrate, the gas molecules are "caged" within a crystal structure composed of water molecules. Sometimes gas hydrates are called "gas clathrates". Clathrates are substances in which molecules of one compound are completely "caged" within the crystal structure of another. Thus, gas hydrates are one type of clathrate.

Two broad techniques are generally used to overcome or control hydrate formation, namely thermodynamic and kinetic, which can be used alone or in conjunction. For the thermodynamic approach, there are a number of reported or attempted methods, including water removal, increasing temperature, decreasing pressure, addition of "antifreeze" to the fluid and/or a combination of these. For the kinetic approach, attempts have been made to (a) prevent the smaller hydrocarbon hydrate crystals from agglomerating into larger ones (known in the industry as an anti-agglomerate) and/or (b) inhibit, retard and/or prevent initial hydrocarbon hydrate crystal nucleation; and/or crystal growth (known in the industry as a kinetic hydrate inhibitor).

Kinetic efforts to control hydrates have included the use of different materials as inhibitors. For instance, onium compounds having at least four carbon substituents have been used to inhibit the plugging of conduits by gas hydrate. Also, additives such as polymers with lactam rings have been employed to control hydrates in fluid systems, for example:

U.S. Pat. No. 6,867,262 discloses a graft polymer gas hydrate inhibitor wherein the graft polymer comprises a base polymer and vinyl caprolactam (in ethylene glycol) grafted onto the base polymer;

U.S. Pat. No. 6,451,892 discloses a composition that includes a homopolymer of vinyl caprolactam, a glycol ether polymerization solvent, a carrier solvent and optionally water or methanol;

U.S. Pat. No. 6,359,047 discloses a composition comprising a copolymer based on vinyl caprolactam and N,N-diethylaminoethyl meth(acrylate) in admixture with a low molecular weight glycol ether as a hydrate inhibitor;

U.S. Pat. No. 6,281,274 discloses the use of a hydrate inhibitor composition comprising a copolymer of vinyl caprolactam and vinyl pyridine made in 2-butoxyethanol;

U.S. Pat. No. 6,242,518 teaches a gas hydrate inhibitor composition comprising a homopolymer of vinyl caprolactam made in a mixture of a glycol ether and water;

U.S. Pat. No. 6,194,622 teaches a method for inhibiting hydrate formation using a copolymer of a surfactant monomer and vinyl caprolactam in admixture with an alcohol or glycol;

U.S. Pat. No. 6,180,699 discloses the use of a homopolymer of vinyl caprolactam, made in a glycol ether, and a polyoxyalkyldiamine or polyoxyaryldiamine as a hydrate inhibiting composition;

U.S. Pat. No. 6,096,815 discloses a composition for preventing the formation of gas hydrates comprising a homopolymer of vinyl caprolactam and an alcohol containing 3 to 5 carbon atoms;

U.S. Pat. No. 5,880,319 teaches a method for using an N-vinyl lactam polymer and an alcohol to reduce the tendency of clathrate agglomeration;

U.S. Pat. No. 5,874,660 discloses a method for inhibiting hydrate formation using a kinetic hydrate inhibitor comprising a polymer formed from N-methyl-N-vinylacetamide and vinyl caprolactam in water, brine or low molecular weight alcohols; and U.S. Pat. No. 5,432,292 discloses a method for controlling clathrate hydrates in fluid systems utilizing a terpolymer comprising N-vinyl caprolactam.

Notwithstanding the state of the technology, it is an object of the present disclosure to provide a method for producing an improved poly(vinyl caprolactam) polymer and the use of such polymer as a kinetic hydrate inhibitor in the transport of natural gas and/or liquid hydrocarbons through a conduit or as a component in a personal care composition.

SUMMARY OF THE INVENTION

The present disclosure provides a kinetic hydrate inhibitor containing a poly(vinyl caprolactam) polymer which has been made and is used in a polymerization solvent system comprising an alkylene carbonate and/or an alkyl lactate. In one embodiment, the poly(vinyl lactam) polymer is a poly (N-vinyl caprolactam) homopolymer.

In another embodiment, there is provided a method for preparing the kinetic hydrate inhibitor of the present disclosure in a polymerization medium, the polymerization medium comprising a vinyl caprolactam compound, a polymerization solvent system and a polymerization initiator.

In still another embodiment, there is provided uses of the kinetic hydrate inhibitor of the present disclosure in methods for inhibiting the formation of natural gas and/or liquid hydrocarbon hydrates in a system by adding the kinetic hydrate inhibitor to the system. In general, the system may be a fluid and/or conduit.

BRIEF DESCRIPTION OF THE DRAWINGS

FIG. 1 depicts the % hydrate conversion in 0.5 wt. % aqueous solutions in the presence of Green Canyon gas at a temperature of 2° (12° sub-cooling).

DETAILED DESCRIPTION OF THE INVENTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "an alkylene carbonate" means one alkylene carbonate or more than one alkylene carbonate. The phrases "in one embodiment", "according to one embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment. If the specification states a component or feature "may", "can", "could", or "might" be included or have a characteristic, that particular component or feature is not required to be included or have the characteristic.

The term "monomer" refers to the repeat units that comprise a polymer. A monomer is a compound that chemically bonds to other molecules, including other monomers, to form a polymer.

The term "polymer" refers to a molecule comprising multiple monomer units connected by covalent chemical bonds. By this definition, a polymer encompasses molecules wherein the number of monomer units ranges from very few, which more commonly may be called oligomers, to very many. Non-limiting examples of polymers include homopolymers which comprise like monomer units, copolymers which comprise two unlike monomer units and which may be in random, blocked or alternating order, and terpolymers which comprise three unlike monomer units and which may be in random, blocked, or alternating order.

The term "performance chemicals" composition refers to non-personal care compositions that serve a broad variety of applications, and include non-limiting compositions such as, adhesives, agricultural, biocides, coatings, electronics, household-industrial-institutional (HI&I), inks, membranes, metal fluids, paper, paints, plastics, printing, plasters, and wood-care compositions.

The term "personal care" composition refers to such illustrative non-limiting compositions as skin, sun, oil, hair, cosmetic, and preservative compositions, including those to alter the color and appearance of the skin. Potential personal care compositions include, but are not limited to, polymers for increased flexibility in styling, durable styling, and increased humidity resistance for hair, skin, and color cosmetics, sun care water-proof/resistance, wear-resistance, and thermal protecting/enhancing compositions.

The term "fluid" means production fluids which, in turn, includes, but is not limited to, formation fluids, crude oil, crude natural gas, and any other fluids encountered in the production of oil and gas.

The present disclosure provides a poly(vinyl caprolactam) polymer obtained by polymerizing a vinyl caprolactam compound in a polymerization solvent system comprising an alkylene carbonate and/or an alkyl lactate and a polymerization initiator. The present disclosure also provides a kinetic hydrate inhibitor comprising the poly(vinyl caprolactam) polymer in admixture with the polymerization solvent system. Applicants have surprisingly found that poly(vinyl caprolactam) polymers may be produced having a similar number- and weight-average molecular weight and distribution as state of the art poly(vinyl caprolactam) polymers which have been prepared in state of the art solvents, such as 2-butoxyethanol or other alcohols or glycols, with the state of the art solvents being replaced by an alkylene carbonate and/or an alkyl lactate. The present method thus represents an improvement with regards to state of the art polymers and methods since the inventive polymerization solvent system has low-toxicity and a VOC-exempt status. Furthermore, the resultant poly(vinyl caprolactam) polymer/polymerization solvent system blend exhibits superior hydrate inhibitor performance relative to state of the art poly(vinyl caprolactam) polymer/solvent blends.

According to one embodiment, the poly(vinyl caprolactam) polymer is a poly(vinyl caprolactam) homopolymer. The poly(vinyl caprolactam) homopolymer may be derived from a vinyl caprolactam compound such as N-vinyl caprolactam, N-vinyl-7-methyl-2-caprolactam and N-vinyl-7-ethyl-2-caprolactam. In one particular embodiment, the poly(vinyl caprolactam) homopolymer is poly(N-vinyl caprolactam) homopolymer. In some embodiments, the poly(vinyl caprolactam) homopolymer may have a weight average molecular weight of about 400 to about 4000, especially about 500 to about 2500, as determined by GPC using polyethylene glycol as the standard.

According to another embodiment the poly(vinyl caprolactam) polymer is a copolymer derived from a vinyl caprolactam compound and one other vinyl lactam compound, such as N-vinyl pyrrolidone, N-vinyl-5-methyl-2-pyrrolidone, N-vinyl-5-ethyl-2-pyrrolidone, N-vinyl-2-piperidone, N-vinyl-6-methyl-2-piperidone and N-vinyl-6-ethyl-2-piperidone. In some embodiments, the poly(vinyl caprolactam) copolymer has a weight average molecular weight average of about 400 to about 4000, especially about 500 to about 2500 as determined by GPC using polyethylene glycol as the standard.

In yet another embodiment, the poly(vinyl caprolactam) polymer is a copolymer or terpolymer derived from a vinyl caprolactam compound and at least one other vinyl lactam compound and/or other monomer, such as a linear, acrylic N-vinylamide monomer (for e.g. N-vinyl formamide, N-vinyl acetamide or N-vinyl-N-methylacetamide), an acrylamide, an N-alkyl acrylamide (for e.g. N,N-dimethylamino acrylamide; N-[1-(2-pyrrolidonylethyl)] acrylamide, an N,N-dialkyl aminoalkyl methacrylamide (for e.g. N,N-dimethylamino propyl methacrylamide), an N,N-dialkyl aminoalkyl (meth)acrylate (for e.g. N,N-dimethylaminoethyl (meth)acrylate) and quaternized salts thereof (which may include N-alkyl bromides, tetrahydrofurfuryl methacrylate, and the like). In a further embodiment, the poly(vinyl caprolactam) copolymer or terpolymer has a molecular weight average of about 400 to about 4000, especially about 500 to about 2500, as determined by GPC using polyethylene glycol as the standard.

Suitably such poly(vinyl caprolactam) copolymers and terpolymers should contain at least about 40% by weight of vinyl caprolactam, and especially at least about 50% by weight of vinyl caprolactam, based on the total weight of the copolymer or terpolymer.

In some embodiments, the amount of vinyl caprolactam compound in the polymerization medium may be up to about 60% by weight, based on the total weight of the polymerization medium. In other embodiments, the amount of vinyl caprolactam compound in the polymerization medium may be from about 10% by weight to about 50% by weight, based on the total weight of the polymerization medium.

In another embodiment, the polymerization solvent system includes an alkylene carbonate. The alkylene carbonate is a compound represented by the structure:

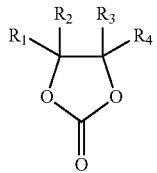

where $R_1$, $R_2$, $R_3$ and $R_4$ are each, independently, hydrogen, hydroxymethyl or a linear or branched $C_1$-$C_{10}$ alkyl group. The alkylene carbonate may be produced by a number of known processes, including the reaction of a glycol with phosgene, transesterification of a glycol with a diethyl carbonate, or by the reaction of the corresponding 1,2-epoxide with carbon dioxide in the presence of a catalyst, as such methods are known in the art.

Examples of alkylene carbonates include, but are not limited to, ethylene carbonate, propylene carbonate, trimethylene carbonate, 1,2-butylene carbonate, 2,3-butylene carbonate, iso-butylene carbonate, glycerine carbonate and mixtures thereof. Thus, in one embodiment, the alkylene carbonate is selected from ethylene carbonate, propylene carbonate, 1,2-butylene carbonate and a mixture thereof. In another embodiment, the alkylene carbonate is propylene carbonate.

According to another embodiment, the polymerization solvent system includes an alkyl lactate. In one embodiment, the alkyl lactate is an aliphatic linear or branched $C_1$-$C_{10}$ alkyl lactate. In a further embodiment, the alkyl lactate is a linear or branched aliphatic $C_1$-$C_4$ alkyl lactate. The alkyl lactates may be present in the form of D- and/or L-lactates, with particular embodiments preferring the L-lactates.

Examples of alkyl lactates include methyl lactate, ethyl lactate, n-propyl lactate, iso-propyl lactate, n-butyl lactate, iso-butyl lactate, cyclohexyl lactate, 2-ethylhexyl lactate, 2-methylcyclohexyl lactate, heptyl lactate, octyl lactate and mixtures thereof. In one embodiment, the alkyl lactate is selected from methyl lactate, ethyl lactate, n-propyl lactate, iso-propyl lactate, n-butyl lactate, iso-butyl lactate and a mixture thereof. In a further embodiment, the alkyl lactate is selected from an ethyl lactate, n-propyl lactate, n-butyl lactate and a mixture thereof. In still another embodiment, the alkyl lactate is n-butyl lactate.

In some embodiments, the polymerization medium may contain up to about 75% by weight of the polymerization solvent system, based on the total weight of the polymerization medium. In other embodiments, the polymerization medium may contain from about 5% by weight to about 60% by weight of the polymerization solvent system, based on the total weight of the polymerization medium. In still another embodiment, the polymerization may contain from about 10% by weight to about 50% by weight, based on the total weight of the polymerization medium.

In another embodiment, the polymerization medium contains a polymerization initiator. As initiators for polymerization it is possible to use peroxide compounds, including di-tert-butyl peroxide, di-tert-amyl peroxide, dicumyl peroxide, 2,5-dimethyl-2,5-bis-(tert-butylperoxy)-hexane, 2,2-bis(tert-butylperoxy)-butane, 1,1-bis-(tert-butylperoxy)-3,3,5-trimethylcyclohexane or 4,4-di-(tert-butylperoxy)-butyl valerate, 2,5-dimethyl-2,5-di-(t-buylperoxyl)hexane and mixtures thereof.

In some embodiments, the polymerization initiator may generally be used in an amount of about 0.01-10% by weight, based on the total weight of the polymerization medium. In other embodiments, the polymerization initiator may be used in an amount of about 0.02-5% by weight, based on the total weight of the polymerization medium.

The polymerization may be carried out by means of a batch process or a (semi)continuous feed process. In some embodiments, the polymerization may take place at a temperature ranging from about 40° C. to about 200° C., in other embodiments from about 60° C. to about 170° C., while in still other embodiments from about 85° C. to about 150° C. Polymerization is normally conducted under atmospheric pressure but may also proceed under reduced or elevated pressure, such as between 1 and 10 bar The polymerization may also be carried out in an inert gas atmosphere, for example nitrogen.

According to another embodiment, the kinetic hydrate inhibitor of the present disclosure includes the poly(vinyl caprolactam) polymer, for e.g. poly(N-vinyl caprolactam) homopolymer, in admixture with the polymerization solvent system. In some embodiments the poly(vinyl caprolactam) polymer, for e.g. poly(N-vinyl caprolactam) homopolymer and polymerization solvent system may, during the polymerization or after the polymerization, be diluted with water or methanol to form a homogeneous aqueous solution of a desired concentration. The water can be added continuously, intermittently or all at once. Thus, in some embodiments, the thus-formed poly(vinyl caprolactam) polymer, for e.g. poly (N-vinyl caprolactam) homopolymer, and polymerization solvent system can be further diluted with a dilution liquid, such as water or methanol, or mixtures thereof, if desired, to form a diluted composition. Ratios of blends of poly(vinyl caprolactam) polymer/polymerization solvent system to dilution liquid may range from 0.5:1 to 5:1, such as about 1:1.

Generally, the amount of poly(vinyl caprolactam) polymer that may be in admixture with the polymerization solvent system in the kinetic hydrate inhibitor may range from about 20% to about 80% by weight, such as about 25% to 55% by weight, based on the total weight of poly(vinyl caprolactam) polymer and polymerization solvent system. In other embodiments, the % by weight ratio of polymerization solvent system to poly(vinyl caprolactam) polymer is from about 90:10 to 10:90, in other embodiments from 75:25 to 25:75, and in further embodiments from 60:40 to 40:60. According to one embodiment, the kinetic hydrate inhibitor of the present disclosure may be used in methods for inhibiting the formation of natural gas and/or liquid hydrocarbon hydrates in a system, the method comprising adding the kinetic hydrate inhibitor of the present disclosure to the system.

Viewed from a further aspect, the present disclosure provides the use of the kinetic hydrate inhibitor as described herein as a kinetic gas hydrate inhibitor for inhibiting the formation of hydrates in a system, such as a system for hydrocarbon drilling, production, storage and/or transportation, including production, drilling, completion, fracturing, stimulation and injection and re-injection operations. Typically, the "system" referred to herein is a fluid and/or a conduit. Thus, in one embodiment, there is provided a method of inhibiting the formation of hydrates in a fluid which includes the step of adding the kinetic gas hydrate inhibitor to the fluid.

Addition of the kinetic gas hydrate inhibitor to the system may be achieved through any known means and in amounts typical in the art. However, due to the surprising efficacy of the kinetic gas hydrate inhibitor of the present disclosure, lower amounts may be required than of conventional hydrate inhibitor compositions. In one embodiment, typical kinetic gas hydrate inhibitor use concentrations, calculated as 100% of active substance, may be from about 0.005% by weight to about 8% by weight, for instance, about 0.0075% by weight to about 5% by weight, especially about 0.01% by weight to about 3% by weight and even concentrations of from about 0.02% by weight to about 1% by weight (100-10,000 ppm), based on the total amount of water in the system. The present disclosure is useful for inhibiting hydrate formation for many hydrocarbons and hydrocarbon mixtures, for e.g. those which include methane, ethane, propane, n-butane, isobutane, isopentane and mixtures thereof. Other examples include various natural gas mixtures that are present in many gas and/or oil formations and natural gas liquids (NGL). The hydrocarbons may also comprise other compounds including, but not limited to $CO_2$, hydrogen sulphide, and other compounds commonly found in gas/oil formations or processing plants, either naturally occurring or used in recovering/processing hydrocarbons from the formation or both, and mixtures thereof.

The methods and uses of the present disclosure involve contacting a system with the kinetic gas hydrate inhibitor as described herein. When an effective amount of such kinetic gas hydrate inhibitor is used, hydrate blockage in a conduit is inhibited. The contacting may be achieved by means of standard equipment such as injection pumps or the like, resulting in rapid and uniform distribution of the inhibitor in the aqueous phase which has a tendency to form hydrates.

The contacting can be made in-line or off-line or both. If needed or desired, the kinetic gas hydrate inhibitor, or some of its components, may be optionally removed or separated mechanically, chemically, or by other methods known to one skilled in the art, or by a combination of these methods after the hydrate formation conditions are no longer present.

The pressure at which the kinetic gas hydrate inhibitor is contacted with fluid is usually at or greater than atmospheric pressure. (i.e. about 101 kPa), such as greater than about 1 MPa, and even more greater than about 5 MPa. The pressure in certain formation or processing plants or units could be much higher, for example greater than about 20 MPa. There is no specific high-pressure limit. The present kinetic gas hydrate inhibitor can be used at any pressure that allows formation of gas hydrates.

Since the kinetic gas hydrate inhibitor primarily retards or prevents the formation of gas hydrates, the addition of the inhibitor should ideally take place before hydrates are formed, i.e. at above the equilibrium temperature of hydrate formation. The temperature for contacting is usually below, the same as, or not much higher than the ambient or room temperature. Lower temperatures tend to favor hydrate formation, thus requiring the treatment with the kinetic gas hydrate inhibitor of the present disclosure. At much higher temperatures, however, hydrocarbon hydrates may not form, thus obviating the need of carrying out any treatments.

In the methods and uses of the present disclosure, the kinetic gas hydrate inhibitor described herein may be added to the system at any stage or location suitable to inhibit formation of hydrates. The conduits into which the kinetic gas hydrate inhibitor may be added are typically hydrocarbon conduits extending for at least part of the length from the site within a hydrocarbon well at which hydrocarbon enters the borehole to the facility remote from the well at which hydrocarbon compositions are processed. Typically, the kinetic gas hydrate inhibitor is added to a process stream containing hydrocarbons and water by injection via a single port or multiple ports. In one aspect, the kinetic gas hydrate inhibitor may be injected into the reservoir matrix surrounding a hydrocarbon production well. In a further aspect, the kinetic gas hydrate inhibitor may be injected into a hydrocarbon production well. In another aspect, the kinetic gas hydrate inhibitor is injected at the well head.

The kinetic gas hydrate inhibitor of this disclosure may be used alone or in combination with an additional component(s), including, but not limited to, salts, weighting agents, inert solids, fluid loss control agents, emulsifiers, dispersion aids, corrosion inhibitors, emulsion thinners, emulsion thickeners, viscosifying agents, gelling agents, high-pressure, high-temperature emulsifier-filtration control agents, surfactants, particulates, proppants, gravel particulates, lost circulation materials, foaming agents, gases, pH control additives, breakers, biocides, crosslinkers, stabilizers, chelating agents, scale inhibitors, thermodynamic hydrate inhibitors, second kinetic hydrate inhibitors, mutual solvents, oxidizers, reducers, friction reducers, clay stabilizing agents, or any combination thereof.

The described poly(vinyl caprolactam) polymers may provide benefits outside of the oil and gas industry. These benefits may include rheology control, de-emulsification, biocidal activity, shale-swelling inhibition, scale inhibition, solubilization, wax inhibition, and deposition of actives (such as biocides or fragrances). Consequently, the poly (vinyl caprolactam) polymers are expected to be useful in other performance chemicals compositions and personal care compositions. For example, the poly(vinyl caprolactam) polymers may be combined with components typical for adhesive, agricultural, biocide, cleaning, coating, encapsulation, or membrane use to form a performance chemicals compositions.

EXAMPLES

Comparative Example 1

To a 200-ml beaker containing 120.0 g of molten N-vinyl caprolactam (40-60° C.) was added 2.4 g di-t-butyl peroxide and the mixture was agitated for 10 minutes. To a one-1 4-neck round-bottom flask equipped with a mechanical stirrer, condenser, and temperature probe was added 80.0 g butyl cellosolve (2-butoxyethanol, Dow). The afore-mentioned mixture containing N-vinyl caprolactam was transferred to a 300-ml pressure-equalizing addition funnel which was then fitted to the reaction assembly. Prior to transfer, the addition funnel was wrapped with heating tape that was adjusted such to maintain the contents in a molten state throughout the addition (40-60° C.). The butyl cellosolve solvent present in the reaction flask was heated to 150° C. with stirring while simultaneously purging the assembly with nitrogen. Once the solvent stabilized at 150° C. and the assembly purged with nitrogen for at least 30 minutes, the afore-mentioned mixture containing N-vinyl caprolactam was charged dropwise to the flask over 1 hour while maintaining a reaction temperature of 150° C. After completion of the addition, the flask contents were further maintained at 150° C. for 1.5 hours. The resulting product was cooled and discharged below 60° C. The resulting product was a light yellow liquid. GPC (THF solvent, 1.0 wt. % t-butyl amine, PPG standards): $M_n$=517, $M_w$=663.

Example 1

To a 500-ml beaker containing 75.0 g propylene carbonate at ambient temperature was slowly added 111.0 g of molten N-vinyl caprolactam (40-60° C.) with stirring. To this was further added 1.8 g di-t-butylperoxide and the final mixture agitated a further 10 minutes. To a one-l 4-neck round-bottom flask equipped with a mechanical stirrer, condenser, and temperature probe was added 262.5 g propylene carbonate. The afore-mentioned mixture containing N-vinyl caprolactam was transferred to a 500-ml pressure-equalizing addition funnel which was then fitted to the reaction assembly. The contents of the flask were stirred while simultaneously being heated to 150° C. and purging with nitrogen. Once the stirring flask contents stabilized at 150° C. and the assembly purged with nitrogen for at least 30 minutes, the afore-mentioned mixture containing N-vinyl caprolactam was charged dropwise to the flask over 1 hour while maintaining a reaction temperature of 150° C. After completion of the addition, the flask contents were further maintained at 150° C. for 1.5 hours. The resulting product was cooled and discharged below 60° C. The resulting product was a pale yellow liquid. 25 wt. % theoretical solids. GPC (THF solvent, 1.0 wt. % t-butyl amine, PPG standards): $M_n$=546, $M_w$=717.

Example 2

The procedure given in Example 1 was repeated except that 1.8 g Luperox® 101 (2,5-dimethyl-2,5-di(t-butylperoxy)hexane, Arkema) was used as the initiating species in place of di-t-butylperoxide. The resulting product was a pale yellow liquid. 25 wt. % theoretical solids. GPC (THF solvent, 1.0 wt. % t-butyl amine, PPG standards): $M_n$=449, $M_w$=656.

Example 3

The procedure given in Example 1 was repeated except that (S)-n-butyl lactate was used as solvent in place of propylene carbonate. 120.0 g butyl lactate was added to the reaction flask and the blend containing N-vinyl caprolactam consisted of 180.0 g N-vinyl caprolactam, 150.0 g butyl lactate, and 4.0 g di-t-butylperoxide. 40 wt. % theoretical solids. GPC (THF solvent, 1.0 wt. % t-butyl amine, PPG standards): $M_n$=566, $M_w$=633.

Example 4

The procedure given in Example 1 was repeated except that (S)-n-butyl lactate was used as the solvent in place of propylene carbonate and Luperox® 101 was used as initiator in place of di-t-butylperoxide. 1028.9 g butyl lactate was added to the reaction flask and the blend containing N-vinyl caprolactam consisted of 1234.0 g N-vinyl caprolactam, 823.1 g butyl lactate, and 17.1 g Luperox® 101. 40 wt. % theoretical solids. GPC (THF solvent, 1.0 wt. % t-butyl amine, PPG standards): $M_n$=456, $M_w$=508.

Hydrate Inhibition Testing

Experiments were performed in a custom-built 500-mL volume, 100 Bar pressure-rated testing cell. Gas pressure, temperature, stirring speed and torque power were controlled and continuously recorded. Prior to testing, the cell was charged with the fluid to be tested and pressurized to ~50 psi with test gas. The fluid was then heated to 40-45° C. with stirring and maintained at that temperature for six hours to rinse the cell. The fluid was then drained and the cell charged with new test fluid. The cell was pressurized with gas and cooled to the desired pressure-temperature conditions. Occasionally, a minor adjustment to the pressure was necessary upon completion of this step. The fluid was then maintained at constant temperature until gas hydrate conversion, defined as $$100 \times \left(1 - \frac{p_f}{p_i}\right),$$

where $p_f$ and $p_i$ are the final and initial pressures, respectively, reached 10%. A stirring speed of 250 rpm was maintained throughout the procedure. Upon completion of the test, the fluid was warmed to 40-45° C. and maintained at that temperature for six hours to completely melt the hydrates formed during the test. The fluid was then cooled to the same initial pressure-temperature conditions employed above and duplicate tests was conducted in the same manner as the first.

The test fluids consisted of 0.5 wt. % aqueous solutions of materials prepared according to the above examples. Each was monitored for hydrate formation in the presence Green Canyon gas (87.2 mol % methane, 7.6 mol % ethane, 3.1 mol % propane, 0.8 mol % n-butane, 0.5 mol % isobutene, 0.4 mol % nitrogen, 0.2 mol % isopentane, 0.2 mol % n-pentane) at an initial pressure of ~550 psi and a temperature of 2° C. (12° C. sub-cooling). The % hydrate conversion, calculated as detailed above, was plotted as a function of time in hours. (FIG. 1).

Hydrate inhibitor performance data displayed in FIG. 1 indicate that poly(vinyl caprolactam) polymer obtained in Example 4 is a significantly better kinetic gas hydrate inhibitor than the one produced in Comparative Example 1.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A kinetic hydrate inhibitor comprising a poly(vinyl caprolactam) polymer obtained by polymerizing a vinyl caprolactam compound in a polymerization solvent system comprising an alkylene carbonate and/or an alkyl lactate and a polymerization initiator.

2. The kinetic hydrate inhibitor of claim 1, wherein the poly(vinyl caprolactam) polymer is a homopolymer and the vinyl caprolactam compound is N-vinyl caprolactam.

3. The kinetic hydrate inhibitor of claim 1, wherein the polymerization solvent system consists of an alkylene carbonate.

4. The kinetic hydrate inhibitor of claim 1, wherein the alkylene carbonate is selected from ethylene carbonate, propylene carbonate, 1,2-butylene carbonate and a mixture thereof.

5. The kinetic hydrate inhibitor of claim 1, wherein the polymerization solvent system consists of an alkyl lactate.

6. The kinetic hydrate inhibitor of claim 5, wherein the alkyl lactate is selected from methyl lactate, ethyl lactate, n-propyl lactate, iso-propyl lactate, n-butyl lactate, iso-butyl lactate and a mixture thereof.

7. The kinetic hydrate inhibitor of claim 1, wherein the polymerization initiator is a peroxide compound including di-tert-butyl peroxide, di-tert-amyl peroxide, dicumyl peroxide, 2,5-dimethyl-2,5-bis-(tert-butylperoxy)-hexane, 2,2-bis(tert-butylperoxy)-butane, 1,1-bis-(tert-butylperoxy)-3,3,5-trimethylcyclohexane or 4,4-di-(tert-butylperoxy)-butyl valerate or a mixture thereof.

8. A kinetic hydrate inhibitor comprising a poly(vinyl lactam) polymer in admixture with a polymerization solvent system comprising an alkylene carbonate and/or an alkyl lactate.

9. The kinetic hydrate inhibitor of claim 8, wherein the poly(vinyl lactam) polymer is a poly(N-vinyl caprolactam) homopolymer.

10. The kinetic hydrate inhibitor of claim 9, wherein the % by weight ratio of polymerization solvent system to poly(N-vinyl caprolactam) homopolymer is from 90:10 to 10:90, preferably from 75:25 to 25:75, and more preferably from 60:40 to 40:60.

11. A performance chemicals composition comprising the kinetic hydrate inhibitor of claim 8.

12. A kinetic gas hydrate inhibitor composition comprising the kinetic hydrate inhibitor of claim 8.

13. A method for preparing a kinetic hydrate inhibitor in a polymerization medium comprising the step of polymerizing a vinyl caprolactam compound in a polymerization solvent system comprising an alkylene carbonate and/or an alkyl lactate and a polymerization initiator.

14. The method of claim 13, wherein the polymerization medium contains up to about 60% by weight of the vinyl caprolactam compound, based on the total weight of the polymerization medium.

15. The method of claim 13, wherein the polymerization medium contains up to about 75% by weight of the polymerization solvent system, based on the total weight of the polymerization medium.

16. The method of claim 13, wherein the polymerization medium contains about 0.01-10% by weight of the polymerization initiator, based on the total weight of the polymerization medium.

17. A method for inhibiting the formation of natural gas and/or liquid hydrocarbon hydrates in a system comprising adding the kinetic hydrate inhibitor of claim 8 to the system.

18. The method of claim 17, wherein the system is a fluid.

* * * * *